United States Patent
Dellow

(10) Patent No.: US 7,796,755 B2
(45) Date of Patent: Sep. 14, 2010

(54) STORAGE OF DIGITAL DATA

(75) Inventor: Andrew R. Dellow, Bristol (GB)

(73) Assignee: STMicroelectronics Limited, Bristol (GB)

( * ) Notice: Subject to any disclaimer, the term of this patent is extended or adjusted under 35 U.S.C. 154(b) by 0 days.

(21) Appl. No.: 11/522,118

(22) Filed: Sep. 15, 2006

(65) Prior Publication Data
US 2007/0067621 A1   Mar. 22, 2007

Related U.S. Application Data

(63) Continuation of application No. 10/099,589, filed on Mar. 13, 2002, now abandoned.

(30) Foreign Application Priority Data

Mar. 15, 2001 (EP) .................................. 01302425

(51) Int. Cl.
*H04N 7/167* (2006.01)
(52) U.S. Cl. ..................................................... 380/205
(58) Field of Classification Search .................. None
See application file for complete search history.

(56) References Cited

U.S. PATENT DOCUMENTS

| | | | |
|---|---|---|---|
| 5,025,458 A | 6/1991 | Casper et al. | |
| 5,832,310 A | 11/1998 | Morrissey et al. | |
| 5,878,135 A | 3/1999 | Blatter et al. | |
| 6,115,434 A * | 9/2000 | Mizobata et al. | 375/340 |
| 6,359,911 B1 * | 3/2002 | Movshovich et al. | 370/536 |
| 6,522,875 B1 | 2/2003 | Dowling et al. | |
| 6,538,656 B1 * | 3/2003 | Cheung et al. | 345/519 |
| 6,633,565 B1 | 10/2003 | Bronstein et al. | |
| 7,039,614 B1 * | 5/2006 | Candelore | 705/57 |
| 2001/0032188 A1 * | 10/2001 | Miyabe et al. | 705/57 |
| 2002/0154694 A1 * | 10/2002 | Birch | 375/240.05 |

FOREIGN PATENT DOCUMENTS

| | | |
|---|---|---|
| EP | 0 949 808 A2 | 10/1999 |
| WO | WO 01 05150 A1 | 1/2001 |

* cited by examiner

*Primary Examiner*—Emmanuel L Moise
*Assistant Examiner*—Nadia Khoshnoodi
(74) *Attorney, Agent, or Firm*—Lisa K. Jorgenson; E. Russell Tarleton; Seed IP Law Group PLLC

(57) ABSTRACT

A device for locating a DES key value that corresponds to a packet identification (PID) contained at a variable possible location which comprises part only of a 32-bit packet header. A table stored in memory contains for each DES key: (i) a packet header having 32 bits with a PID of either 12, 9 or 8 bits contained at a defined location and with zero values elsewhere, and (ii) a mask value also having 32 bits with ones contained at the said defined location of the PID and zeros elsewhere. The table is divided into regions for respective packet format types. An incoming packet header at an input is combined with a first one of the mask values from the table to provide a combined value that consists of the value held in the input packet header at the defined location and zeros elsewhere. This combined value is compared with the corresponding packet header stored in the table. When they are not equal, the combining and comparison is repeated for the next row of the table. When they are equal, the corresponding DES key value is read from the table and provided as an output. The system can cope with variable PID formats within the packet header without alteration to the hardware but merely with re-programming of the table contents.

7 Claims, 2 Drawing Sheets

STORAGE OF DIGITAL DATA

BACKGROUND OF THE INVENTION

1. Field of the Invention

This invention relates to the storage and processing of digital data, and particularly, though not exclusively, to the storage and processing of encryption and decryption keys associated with program identifications in a packet-based digital video storage system using the well-known DES data encryption standard for encryption of the stored data.

2. Description of the Related Art

With the increasing speed and capacity of hard disk drives and the increasing effectiveness of data compression schemes, it has become possible to contemplate the real-time storage of digital video signals at broadcast television standards. When the television signal to be stored is derived from a conditional-access (or subscription) channel, it is desired that the signal will automatically be encrypted when it is written to the disk to reduce the likelihood of it being copied and made available to non-subscription payers. One proposal is to encrypt the signal using the DES standard operating with 56 bit keys. In fact the DES standard specifies a 56-bit key with 8 parity bits, giving 64 bits in all.

The video signal in digital form is provided in packetized format. Each packet will typically consist of a header containing a number of framing bits, an information section containing specified information, and a payload containing a portion of the signal itself. The information section includes a program identification (PID) as part of its contents. This identifies the program being transmitted, or a portion of it, as there, in fact, may be several PIDs used in a single program. The PID is used, amongst other things, to select which of a plurality of predetermined DES keys are used in the DES encryption process in order to encrypt the data for storage on the hard disk. The header is recorded on the hard disk unencrypted. On replay, the PID in the header is again used to determine which keys are required for the decryption operation. For convenience the word "cryption" will be used to refer to either the encryption operation or the decryption operation, as the case may be.

Unfortunately, many different standards exist for the detailed format of the packet structure. One packet format used is DVB (digital video broadcasting), and another is DSS (direct satellite system) transport stream. In DVB transport streams, the packet length is 188 bytes (1504 bits). The packet header is 4 bytes long, consisting of a framing sequence that is 8 bits (or one byte) long, and an information section that is 24 bits (or 3 bytes) long. The PID is 12 bits long and is located in bits 11 to 22 of the packet header. For more information concerning the packet format in the DVB scheme, reference may be made ISO/IEC-13818.

DSS transport stream packets are 130 bytes long with a two-byte packet header. DSS transport streams are a proprietary DirecTV format. Both DVB and DSS streams can be demultiplexed to give a PES (packetized elementary stream). In this the packets and headers may be of variable length and format. The PES equivalent of a PID is usually located in bits 13 to 20 of the packet header.

For more information concerning the packet format in the PES scheme, reference may be made to ISO/IEC-13818.

In each case, in order to determine the keys to be used in the DES cryption operation, a two-fold operation is required. As a first step, the PID must be identified from the header. The PID will be located in one of three different places, depending upon whether the data comprises DVB or DSS transport packets or PES packets. A different search scheme for locating the PID is therefore required depending on which of the three packet types is being used. The second step in the operation is then to search a table which contains all the allowable PIDs and associated with each of them the appropriate DES cryption keys. In this way the required keys are obtained.

BRIEF SUMMARY OF THE INVENTION

The process described can be simplified and thus speeded up by choosing to store the PID/key correspondences in a special format. Furthermore, the system is of wider application and would permit the ready introduction of new formats.

The embodiments of the invention pertain to a digital apparatus and method for locating, for a packet identification (PID) contained at a variable possible location which comprises part only of a packet header of up to 32 bits in length, a corresponding DES key value. A table stored in memory contains for each DES key (i) a packet header comprising 32 bits with a possible PID of e.g., 12, 8 or 9 bits contained at a defined location and with zero values elsewhere, and (ii) a mask value also comprising 32 bits with ones contained at the said defined location of the PID and zeros elsewhere. An incoming packet header at an input is combined with a first one of the mask values from the table so as to provide a combined value which consists of the value held in the input packet header at the defined location and zeros elsewhere. This combined value is compared with the corresponding packet header stored in the table. If they are not equal, the combining and comparison is repeated for the next row of the table. If they are equal, the corresponding DES key value is read from the table and provided as an output. The system can cope with variable PID formats within the packet header without alteration to the hardware but merely with re-programming of the table contents.

The table may be divided into regions so that if the type of packet format being received is known, only the corresponding region of the table needs to be searched.

Thus there may be a region for DVB packets, a region for DSS packets, and a region for PES packets.

BRIEF DESCRIPTION OF THE SEVERAL VIEWS OF THE DRAWINGS

The embodiments of the invention will now be described in more detail, by way of example, with reference to the accompanying drawings, in which.

DETAILED DESCRIPTION OF THE INVENTION

The figures illustrate a storage and search system that receives incoming packets with a 32-bit header that contains a packet identification (PID) in one of three possible locations and determines the appropriate DES cryption key for that packet from its PID. The system is used in writing digital video to and reading it from an EIDE hard disk drive.

Figure 1:
FIG. 1 shows a table containing a mask, a header, and the corresponding DES key.

Referring first to FIG. 1, there is illustrated a table 10 which contains the required DES keys 12. Hitherto, associated with each DES key would be a PID typically of 12, 8 or 9 bits. As shown in FIG. 1, however, associated with each key is a header 14 comprising up to 32 bits and a mask 16 also comprising 32 bits. In FIG. 1, for reasons of space the full number of bits is not shown and they are in arbitrary but nevertheless illustrative positions.

The 32 bits forming the entry in the mask column for each DES key comprise a predetermined number of zeros and a predetermined number of ones. There are ones at the bit locations occupied by the PID in a 32-bit packet header. Thus if in the DVB system the PID is constituted by the 12 bits 11 to 22 of the header, then in the mask 16 bits 0 to 10 and 23 to 31 will all be zeros and bits 11 to 22 will all be ones. If in the DSS system the PID is constituted by the 9 bits 7 to 15 of the header, then in the mask 16 bits 0 to 6 and 16 to 31 will all be zeros and bits 7 to 15 will all be ones. Equally, if in the PES system the PID is constituted by the 8 bits 13 to 20 of the header, then in the mask 16 bits 0 to 12 and 21 to 31 will all be zeros and bits 13 to 20 will all be ones. Different lines in the table can thus correspond not only to different PIDs but also to different packet formats.

Provision is preferably also made to divide the table into three regions 18a, 18b, 18c, and to select a region to be searched by the PID matching apparatus. This allows multiple transport stream formats to be simultaneously supported without having to reprogram the entire key table.

The same PID may then be used by more than one transport stream, requiring the retrieval of multiple keys for the same PID. Multiple transport streams of the same format can be simultaneously supported by storing the data associated with each stream in a different region.

The header column 14 in the table is arranged so that in the bit positions for which the mask column contains zeros the header column also contains zeros. In the bit positions for which the mask column contains ones, the header column contains the PID to which the DES key on that line of the table corresponds. Different rows in the table correspond to different PIDs and different header formats. That is, only a single table is required although there are three possible formats for the header, optionally divided into three regions.

Figure 2:
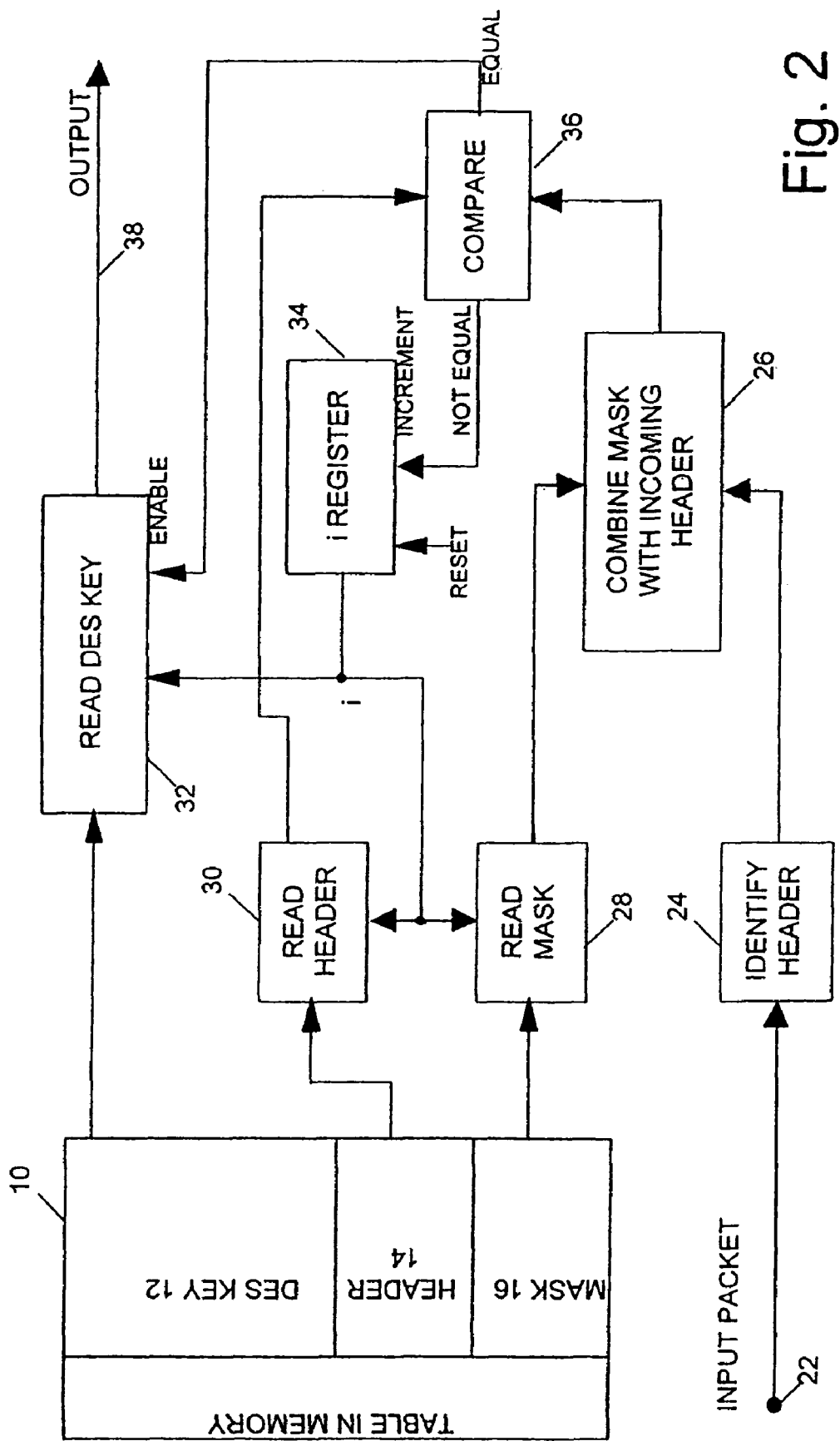
FIG. 2 is a block diagram of apparatus for searching the table to locate the DES key which is appropriate for the header of an incoming packet.

The digital apparatus 20 for searching the table is shown in block form in FIG. 2. The apparatus includes an input 22 for receiving incoming packets. The packets may be of DVB, DSS or PES format, but all contain a PID in a specified location in the packet header. A circuit 24 locates and identifies this header, and passes it to a first input of a combining circuit 26.

A table 10 of the type illustrated in FIG. 1 is stored in memory. A read circuit 28 is arranged to read the mask entry for a row i, a read circuit 30 is arranged to read the header entry for the same row i, and a read circuit 32 is arranged to read the DES key entry for the same row i. The value of i is set in an i register 34, which is initially reset to the beginning of the selected region (or to one if the table is not divided into regions) and then incremented stepwise by 1 as described below. The output of the read mask circuit 28 is applied to the second input of the combining circuit 26.

The output of the combining circuit 26 is applied to a first input of a comparator 36 which receives the output of the read header circuit 30 at its second input. The comparator 36 has two outputs. When the values at its first and second inputs are not equal, it applies an output to the i register 34 to increment the value of i by one. When the values at its first and second inputs are equal, the comparator 36 applies an enabling output to the read DES key circuit 32 to cause the circuit 32 to read the key for that row of the table and apply it as an output value to an output 38 of the apparatus.

The operation of the apparatus of FIG. 2 will now be described. When a new packet is received at the input 22 its packet header is identified and held in the header identification circuit 24. If the header is less than 32 bits, the bits subsequent to the header in the circuit 24 are set to zero. The value of i held in the i register 34 is reset to the beginning of the selected region of the table, and the incoming header is then checked against the first row in that region of the table 10. This takes place as follows. First, the incoming 32-bit header is combined in the combining circuit or combiner 26 with the mask from the first row of the table. The combining operation is a bitwise multiplication, equivalent to an AND operation, which provides an output of one when both the mask bit and the incoming header bit are ones and otherwise provides an output of zero. The effect of this is to 'cut' out of the header the bits which should contain the PID and set all the other bits to zero.

The 32-bit resultant of this operation is then compared in comparator 36 with the corresponding 32-bit entry in the header column of the table. If the incoming PID does not correspond to the PID stored in the header entry for that row, then the comparator 36 increments the value of i by one and the operation is repeated for the next row of the table. The incoming header is now combined with the mask in the next row of the table and the resultant compared with the header stored in that row.

This operation continues until such time as the output of the combining circuit 26 is the same as the header read from the table. When this happens it means that the current row of the table contains the PID corresponding to the incoming packet header, in the correct position in the header, and thus the DES key held in that row of the table is the DES key required for cryption of that incoming packet. The comparator 36 accordingly now instructs the read circuit 32 to output the DES key to the output 38.

The apparatus then can process the packet header of the next input packet.

If the end of the selected region of the table (or the end of the table as a whole) is reached without a match being found, then an error condition is present and an appropriate output provided.

It will be seen from the description that a two-stage operation of first identifying the PID in one of two locations in the incoming header and then looking up the thus-located PID in a table is simplified. The system can cope with PIDs of different lengths. Not only that, but the system does not need extensive re-programming in order to accommodate possible future packet types in which the PID is located in yet another position. All that is necessary is to define a region of the table in which the ones in the mask column of the table are positioned accordingly. In this way multiple search types can be performed with the same apparatus.

In information terms the table contains a degree of redundancy in that the zero of each mask value are all repeated in the header value for the same row of the table, and successive mask values in the same region of the table are identical. However, the introduction of this redundancy, requiring a larger table than would otherwise be the case, enables the processing to be carried out in a more efficient way.

The apparatus has been illustrated in hardware form, but much, if not all of the circuit can be implemented, if desired, in software. In this case FIG. 2 should be regarded as being in the nature of a flowchart.

Many modifications may be made to the apparatus and method illustrated. For example, the mask values can be stored separately, one for each region of the table, rather than in the table itself. The appropriate mask value is selected in the same way as the appropriate region of the table is selected, in accordance with the known incoming packet format type.

In particular the system can be used for purposes other than the retrieval of keys for writing video packets to and reading them from a hard disk.

All of the U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims, and the equivalents thereof.

The invention claimed is:

1. A digital apparatus for locating a Data Encryption Standard (DES) key value corresponding to a Program Identification (PID) contained at a variable location that has only part of a packet header consisting of a predetermined number of input bits, said apparatus comprising:
   (a) a table storing circuit that is configured to store a table containing a DES key value and, for each DES key value, a corresponding packet header comprising said predetermined number of bits with a PID contained at a variable location in the packet header and with zero values elsewhere;
   (b) a mask value storing circuit formed unitary with the table storing circuit to store mask values corresponding to respective DES key values, each mask value comprising the same predetermined number of bits as said packet headers with ones contained at said variable location and with zero values elsewhere;
   (c) an input for receiving an input packet header comprising said predetermined number of bits;
   (d) a combining circuit coupled to said mask value storing circuit and said input to combine said input packet header and one of said mask values and configured to provide a combined value consisting of a value held in said input packet header at said variable location and zeros elsewhere;
   (e) a read circuit coupled to the table storing circuit to read DES key values from the table storing circuit; and
   (f) a comparing circuit coupled to said table storing circuit and said combining circuit to compare said combined value and one of said packet headers stored in said table storing circuit and, (i) when they are not equal, utilizing a register circuit to repeat the operations of said combining circuit and said comparing circuit for a next packet header and corresponding mask and DES key value stored in said table storing circuit, and (ii) when they are equal, enabling the read circuit to read said corresponding DES key value from said table storing circuit and providing it as an output value.

2. The apparatus of claim 1, in which said table storing circuit is divided into regions, each region corresponding to a respective packet header format.

3. A digital method for locating a Data Encryption Standard (DES) key value corresponding to a Program Identification (PID) contained at a variable location that comprises only part of a packet header consisting of a predetermined number of input bits, said method comprising the steps of:
   (a) storing a table, in a memory, containing DES key value and, for each DES key value, a packet header comprising said predetermined number of bits with a PID contained at a variable location in the packet header and with zero values elsewhere;
   (b) storing mask values in the table, in the memory, corresponding to respective DES key values, each mask value comprising the same predetermined number of bits as said packet headers with ones contained at the variable location and with zero values elsewhere;
   (c) receiving, at an input, an input packet header comprising said predetermined number of bits;
   (d) combining, in a combining circuit, said input packet header and one of said mask values and providing a combined value consisting of a value held in said input packet header at the variable location and zeros elsewhere; and
   (e) comparing, in a comparator, said combined value and one of said packet headers stored in said table and, (i) when they are not equal, incrementing to a next packet header and corresponding DES key values and mask values and repeating said combining and said comparing operations for the incremented packet header stored in said table, and (ii) when they are equal, reading said corresponding DES key value from said table and providing it as an output value.

4. The method of claim 3, in which said table is divided into regions, each region corresponding to a respective packet header format.

5. A digital apparatus for locating a Data Encryption Standard (DES) key value corresponding to a Program Identification (PID) contained at a variable location that comprises only part of a packet header consisting of a predetermined number of input bits, said apparatus comprising:
   (a) a table store for storing a table containing a DES key value and, for each DES key value, a packet header comprising the predetermined number of bits with a PID contained at a variable location in the packet header and with zero values elsewhere;
   (b) a mask value store formed unitary with the table store for storing mask values corresponding to respective DES key values, each mask value comprising the same number of bits as the predetermined number of bits as the packet headers with ones contained at the variable location and with zero values elsewhere;
   (c) an input for receiving an input packet header comprising the same number of bits as the predetermined number of bits;
   (d) a combiner coupled to the mask value store and the input to combine the input packet header and one of the mask values and configured to provide a combined value consisting of a value held in the input packet header at the variable location and zeros elsewhere; (
   e) a read circuit coupled to the table storing means to read DES key values from the table storing means; and
   (f) a comparator coupled to the table store and the combiner for comparing the combined value and one of the packet headers stored in the table and, (i) when they are not equal, utilizing a register circuit to repeat the operations of the combiner and the comparator for the next packet header and corresponding mask and DES key value stored in the table, and (ii) when they are equal, enabling the read circuit to read the corresponding DES key value from the table and providing it as an output value.

6. The apparatus of claim 5, in which the unitary table is divided into regions, each region corresponding to a respective packet header format.

7. A device for locating a Data Encryption Standard (DES) key value, comprising:
   a memory table configured to store a predetermined number of mask bits, Program Identification (PID) header bits, and corresponding DES key bits;

a header identifier circuit coupled to an input and configured to receive an input packet having PID header bits at a variable location in the input packet;

a combiner circuit coupled to the memory table via a mask read circuit and to the header identifier circuit and configured to combine the mask bits and the header bits and to generate a combined value that comprises bits from the header bits;

a compare circuit coupled to an output of the combiner circuit and to a header read circuit and configured to compare the combined value with the PID header bits stored in the memory table, and when the PID header bits stored in the memory table are not equal with the combined value, utilizing an incrementer circuit to increment to next packet header bits and corresponding mask bits and DES key bits and repeatedly reading the next PID header bits stored in the memory table and comparing the next PID header bits from the memory table with the combined value until the next PID header bits and combined value are matched; and a DES key read circuit coupled to the memory table and configured to read from the memory table and output the DES key bits corresponding to the PID header bits in the memory that are matched with the combined value.

* * * * *